United States Patent [19]

Fong

[11] Patent Number: 5,186,728
[45] Date of Patent: Feb. 16, 1993

[54] PROCESS FOR REMOVING VOLATILE ORGANIC MATERIALS

[75] Inventor: Raymond T. Fong, Martinez, Calif.

[73] Assignee: Shell Oil Company, Houston, Tex.

[21] Appl. No.: 861,405

[22] Filed: Mar. 31, 1992

[51] Int. Cl.$^5$ .............................................. B01D 47/14
[52] U.S. Cl. ........................................ 55/90; 55/233; 55/240
[58] Field of Search ....................... 55/89, 90, 233, 240

[56] References Cited

U.S. PATENT DOCUMENTS

| | | | |
|---|---|---|---|
| 2,876,863 | 3/1959 | Kivari | 183/114 |
| 2,966,958 | 1/1961 | Sexton | 55/240 X |
| 3,527,701 | 9/1970 | Weiler | 210/40 |
| 3,708,958 | 1/1973 | Duty et al. | 55/90 X |
| 3,739,551 | 6/1973 | Eckert | 55/90 |
| 3,936,281 | 2/1976 | Kurmeier | 55/90 X |
| 3,981,156 | 9/1976 | Modisette et al. | 55/89 X |
| 4,123,365 | 10/1978 | Middelbeek | 210/521 |
| 4,409,908 | 10/1983 | Udyma et al. | 110/346 |
| 4,421,534 | 12/1983 | Walker | 55/89 X |
| 4,708,722 | 11/1987 | Childs | 55/89 |
| 4,722,745 | 2/1988 | Pike | 55/233 X |
| 4,738,695 | 4/1988 | Carr et al. | 55/89 X |
| 4,800,025 | 1/1989 | Bibaeff | 210/703 |
| 4,808,319 | 2/1989 | McNally et al. | 55/90 X |
| 4,844,811 | 7/1989 | Gotlieb et al. | 210/703 |
| 4,889,638 | 12/1989 | Rockford et al. | 210/703 |
| 4,948,402 | 8/1990 | Davis | 55/233 |

*Primary Examiner*—Robert Spitzer

[57] ABSTRACT

An apparatus for preventing or reducing the release of volatile organics in the atmosphere that comprises a distributor cup having holes located on the bottom surface of the cup and a vent tube that passes through the cup. The cup is attached to a scrubber body containing inert, solid material held in place by a slotted support plate. A dip-tube extends downwardly from the scrubber body. The invention includes a process that comprises passing water through a distributor cup having holes at the bottom of the cup, allowing water to trickle onto solid, inert material in the scrubber body to produce film on the material and on the internal surfaces of a dip-tube extending from the scrubber body so that vent gases can be scrubbed, and these scrubbed vent gases exit through a vent tube that passes through a distributor cup.

5 Claims, 1 Drawing Sheet

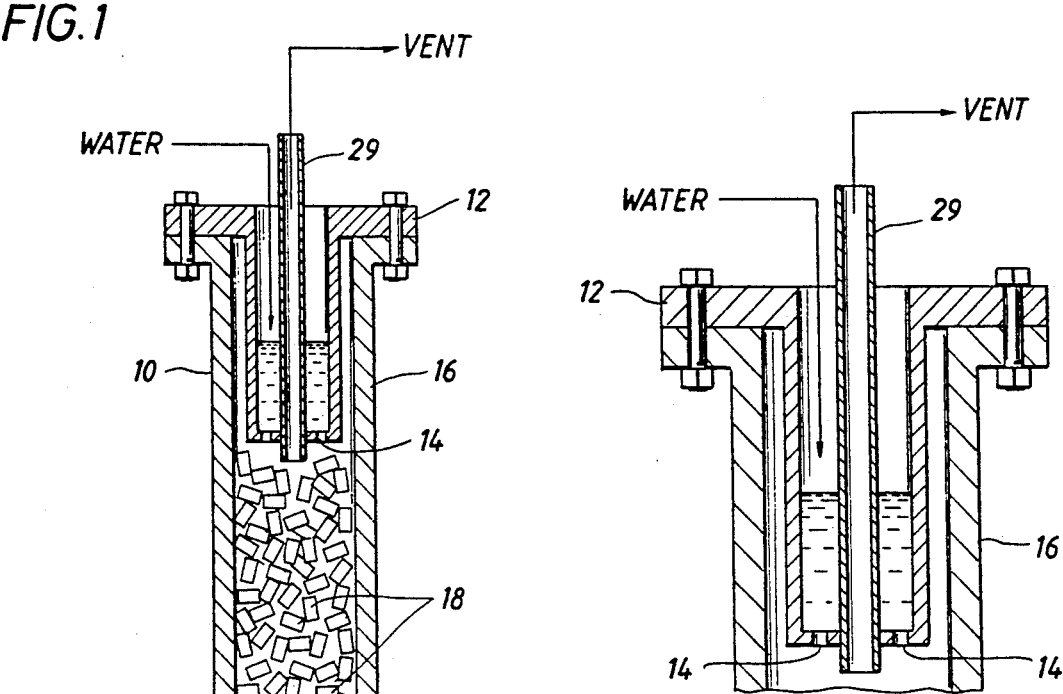
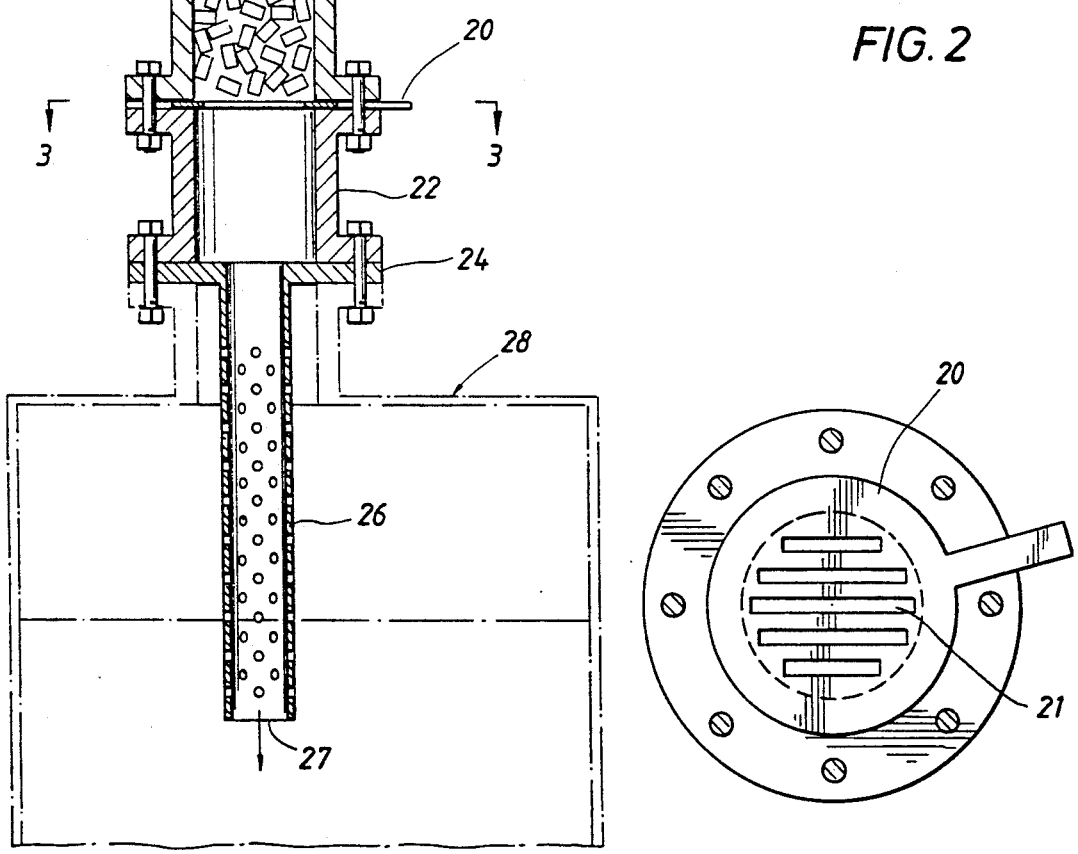
FIG.1
FIG.2
FIG.3

PROCESS FOR REMOVING VOLATILE ORGANIC MATERIALS

BACKGROUND OF THE INVENTION

The invention relates to a process for reducing or eliminating emissions of volatile compounds into the atmosphere and more particularly to a process for reducing or eliminating such emissions of volatile organic compounds which are normally vented from a locus of vented gases including sewer vents or vents on oil/water separators.

Increasingly stringent regulatory requirements seek to minimize the effect on the environment by even small potential sources of volatile compounds, such as low boiling hydrocarbons. Such sources include gases vented from storm and process sewers which have received volatile compounds, for example, hydrocarbons or solvents from sewer systems in industrial, chemical and oil refining and distribution facilities or from oil-/water separator boxes which are commonly used to separate floating oil from aqueous waste streams.

DESCRIPTION OF THE PRIOR ART

There are a number of traditional ways to reduce such emissions. U.S. Pat. No. 2,876.863 describes a method for separating hydrocarbons from an aqueous waste by pressurizing the gas dissolved in the waste. The pressure on the waste is thereafter reduced whereby some dissolved gas is freed from solution. The freed gas carries the more volatile hydrocarbons from the waste, and the evolved gas and the volatilized hydrocarbons are separated from the waste.

U.S. Pat. No. 4,889,638 provides a method of, and apparatus for, separating phases in a polyphase system by gas floatation treatment of a mixture including oil and water to reduce the oil content of the water.

There is a present need for a simple, straightforward, reliable process and apparatus that does not interfere with the operation of a vent on a vented environmental system but that is effective to reduce emissions of volatile compounds from them.

The present invention provides an apparatus and process particularly effective to reduce emissions of volatile organic hydrocarbons from water-bearing sewers and oil/water separator boxes conventionally used in manufacturing and refining facilities.

SUMMARY OF THE INVENTION

The invention provides a process for preventing or reducing the release of volatile organic materials into the atmosphere from vented gases in which the apparatus comprises, in combination,
  a) a distributor cup having holes located on a bottom surface of said cup and a vent tube that passes through said cup;
  b) a scrubber body containing packing material, said packing material held in place by a slotted supported plate and a scrubber connection piece; and
  c) a dip-tube having an opening at the top and bottom for the entry and exiting of water and holes on side of said tube for sewer vent gases to enter for scrubbing.

The invention also relates to a process for preventing or reducing the release of volatile organic materials which comprises,
  a) passing liquid through a distributor cup having holes at the bottom of the distributor cup and onto an inert, solid material contained in a scrubber body;
  b) producing film of the liquid on the inert material and on internal surfaces and over a plurality of holes located in a dip-tube extending from the scrubber body; and
  c) scrubbing sewer vent gases that enter the dip-tube holes and contact counter-currently the liquid film on the dip-tube and the inert material, and exit through a vent tube passing through the distributor cup.

BRIEF DESCRIPTION OF THE DRAWINGS

The invention will be further described with reference to the accompanying drawings wherein:

FIG. 1 is a vertical cross-sectional view of the packed column scrubber of the invention.

FIG. 2 is a cut-away side of FIG. 1.

FIG. 3 is a top view of FIG. 1.

DETAILED DESCRIPTION OF THE INVENTION

The invention is a process that uses a packed-column scrubber for the reduction of emissions of volatile compounds from vented gases. The process in conjunction with the apparatus incorporates liquid, preferably water, to reduce emissions of vent gases from sewers, plenum chambers, and conventional oil-water separator boxes. The apparatus can be mounted on a hatch, sewer cover, or any vent opening directly over the locus of the vent gases, preferably sewer vents. The use of a scrubber directly on sewer vents is a unique process application. The scrubber works by a combination of condensation, absorption and entrainment of volatile organic vapors. The process uses once-through cool water that is admitted to the top of a distributor cup and flows downwardly through a scrubber body and dip-tube. The cool water condenses, cools and absorbs the organic compounds that are in equilibrium with water in a sewer or similar source of volatile organic material. This use of the scrubber allows the sewer to breathe while meeting air quality requirements. The scrubber is lightweight, easy to construct and operate, relatively inexpensive, and portable. This scrubber does not require pumps or instrumentation and other than water, no utilities are required. Also, no hazardous waste is generated. The scrubbing water can be fresh or recycled water and is treated along with the rest of the effluent which is the source of the volatile materials.

DETAILED DESCRIPTION OF THE DRAWINGS

Referring now to the drawings, FIG. 1 is a vertical cross-sectional view of a water scrubber. The water scrubber 10 is attached to a sewer box 28. The scrubber box 28 can be an API box, CPI box, a junction box or any other sewer system component. This water scrubber 10 has a distributor cup 12 which allows fresh water to be stored for maintaining any fluctuations in the water flow rate, sewer vent gas flow rate, or in the internal pressure of the sewer system during the implementation of the process of the present invention. The water from the distributor cup 12 exits through the holes 14 located in the bottom of the cup 12 and drips onto the inert, solid packing material 18, such as pall rings or rachig rings, that is contained in the scrubber body 16 of the scrubber 10. This packing material 18 is held in place by a slotted supported plate 20 attached to a scrubber connection piece 22. Once the water has exited through the holes 14 located in the bottom of the cup 12, the water forms a film on the inert material and support plate and contacts the rising sewer vent gases to remove much of the hydrocarbon or other vent gases through condensation, absorption and entrainment. The scrubbed vent gases exit the scrubber 10 via the vent tube 29 that passes through the distributor cup 12. The vent gases can then proceed directly to the atmosphere or be routed to a carbon canister system (not shown) for further hydrocarbon removal.

This dip-tube 24 contains an opening at the top and bottom for the entry and exiting of water and holes 26 in the side of the dip-tube 24 for entry of sewer vent gases. Water enters from the top, flows down the sides of the dip-tube, and exits at the end 27 of the dip tube 24 which extends below the liquid level in the sewer. This location of the dip-tube 24 prevents water from freefalling into the sewer, thus minimizing the potential for static electricity generation. The flowing water creates a water film on the internal surfaces and over the holes 26 of the dip-tube 24, thus providing additional scrubbing action since the sewer vent gases entering through the holes 26 in the dip-tube 24 have to pass through this water film to infiltrate the rest of the scrubber 10.

FIG. 2 of the present invention illustrates a cutaway side view of the top portion of a scrubber that consists of the distributor cup 12 in which water is admitted to the top of the distributor cup 12 and exits through holes 14 located in the bottom of the distributor cup 12. This figure also illustrates the vent tube 29 where vent gases exit through the distributor cup 12.

Also. FIG. 3 illustrates a slotted supported plate 20 that holds the packing material located in the scrubber body 16 in place. This slotted supported plate 20 has openings or slits 21 that allow water and gases to pass through.

What is claimed is:

1. A liquid scrubber process for reducing the volatile organic materials in gases which comprises
    a) passing a liquid into a distributor cup extending downwardly into a scrubber body, the cup having a plurality of holes in the bottom thereof and a vent tube passing through the cup;
    b) passing the liquid through the holes of the cup and onto solid, inert material maintained in the scrubber body, thereby producing a film of the liquid on the solid, inert material;
    c) passing the liquid from the scrubber body through a dip-tube having a plurality of holes in the sides thereof, the dip-tube extending downwardly from the scrubber body below the surface of a liquid from which the volatile organic materials vaporize, thereby forming a film of the liquid on the internal surfaces of the dip-tube; and
    d) whereby the volatile organic material enters the dip-tube, contacts the liquid counter-currently during passage of the volatile organic material through the dip-tube and scrubber body, and exits the liquid scrubber through the vent tube.

2. The process of claim 1 wherein the liquid is water.

3. The process of claim 2 wherein the surface of the liquid is the surface of liquid within an industrial sewer system.

4. The process of claim 2 wherein the solid, inert material is pall rings or rachig rings.

5. An apparatus for reducing the release of volatile organic materials to the atmosphere from gases comprising a liquid scrubber having
    a) a scrubber body partially filled with inert, solid material held in place by a support plate extending horizontally through the body;
    b) a distributor cup extending downwardly into the scrubber body, said cup having a plurality of holes in the bottom thereof and a vent tube passing through the cup; and
    c) a dip-tube extending downwardly from the scrubber body, the tube having a plurality of holes in the sides thereof.

* * * * *